United States Patent
Diel et al.

(10) Patent No.: US 6,557,522 B2
(45) Date of Patent: May 6, 2003

(54) CYLINDER HEAD FOR A MULTI-CYLINDER DIRECT-INJECTION SPARK-IGNITION INTERNAL COMBUSTION ENGINE

(75) Inventors: Hartmut Diel, Neckarsulm (DE); Roland Lohmann, Neckarsulm (DE); Holger Wagner, Eppingen-Rohrbach (DE)

(73) Assignee: Audi Aktiengesellschaft, Ingolstadt (DE)

( * ) Notice: Subject to any disclaimer, the term of this patent is extended or adjusted under 35 U.S.C. 154(b) by 0 days.

(21) Appl. No.: 09/950,430

(22) Filed: Sep. 10, 2001

(65) Prior Publication Data

US 2002/0078920 A1 Jun. 27, 2002

(51) Int. Cl.⁷ .............................. F02F 1/24; F01L 1/26; F02B 3/02
(52) U.S. Cl. .................. 123/305; 123/90.27; 123/193.5
(58) Field of Search .......................... 123/90.27, 193.5, 123/294, 305

(56) References Cited

U.S. PATENT DOCUMENTS 6,196,180 B1 * 3/2001 Higashi et al. ...... 123/193.5 X
6,257,178 B1 * 7/2001 Laimbock .................. 123/54.1

FOREIGN PATENT DOCUMENTS

| DE | 41 12 496 C1 | 8/1992 |
| DE | 197 53 965 A1 | 6/1999 |
| DE | 199 06 083 C1 | 4/2000 |
| JP | 1-110865 | 4/1989 |

* cited by examiner

Primary Examiner—Tony M. Argenbright
(74) Attorney, Agent, or Firm—Laurence A. Greenberg; Werner H. Stemer; Manfred Beck

(57) ABSTRACT

A cylinder head for a direct-injection spark-ignition internal combustion engine includes, for each cylinder, an inlet valve, an exhaust valve, a first receptacle, a second receptacle, and a third receptacle. The first, second, and third receptacles are respectively configured to receive an ignition device or an injection device. The first receptacle extends substantially parallel to the inlet valve. The second receptacle extends substantially parallel to the exhaust valve. A common camshaft is offset from a cylinder center plane and actuates the inlet valve and the exhaust valve via identically constructed valve actuating elements. The cylinder head is lightweight, compact and easy to assemble and is in particular suited for high performance engines.

10 Claims, 6 Drawing Sheets

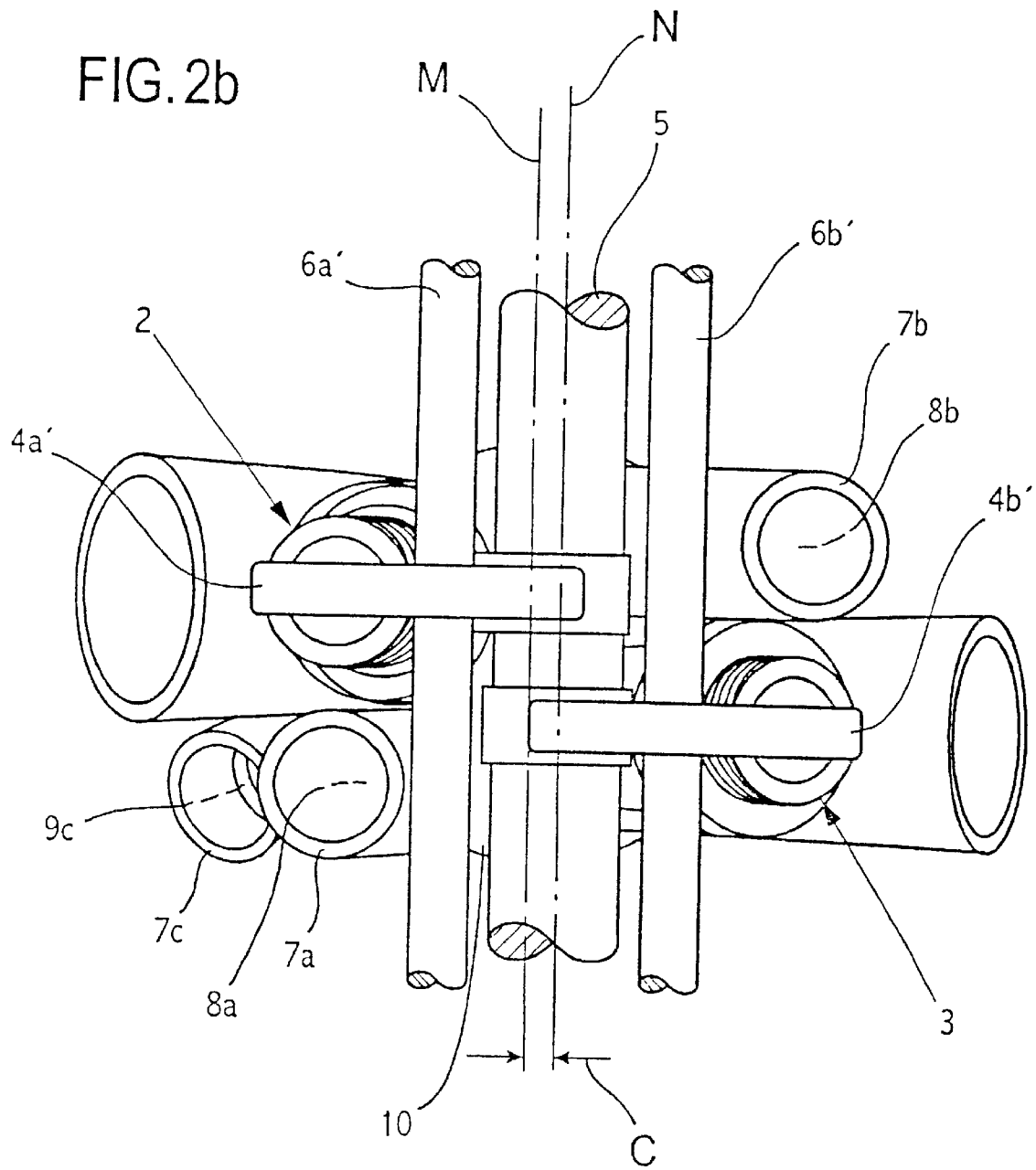

CYLINDER HEAD FOR A MULTI-CYLINDER DIRECT-INJECTION SPARK-IGNITION INTERNAL COMBUSTION ENGINE

BACKGROUND OF THE INVENTION

1. Field of the Invention

The present invention relates to a cylinder head for a multi-cylinder direct-injection spark-ignition internal combustion engine.

Various types of conventional cylinder heads have been developed in the past in order to achieve the best mixture preparation possible in internal combustion engines. In addition to the requirements of the mixture preparation, further demands such as low weight, high cooling capacity and ease of assembly are being made. This applies in particular to cylinder heads of high-performance engines.

2. Summary of the Invention

It is accordingly an object of the invention to provide a cylinder head for a multi-cylinder direct-injection spark-ignition internal combustion engine which is distinguished by a good mixture preparation, low weight and great ease of assembly and is therefore also suitable for high-performance engines.

With the foregoing and other objects in view there is provided, in accordance with the invention, a cylinder head for a direct-injection spark-ignition internal combustion engine with a plurality of cylinders, the cylinder head including:

an inlet valve provided for each of a plurality of cylinders;

an exhaust valve provided for each of the plurality of cylinders;

a first receptacle provided for each of the plurality of cylinders, the first receptacle being configured to receive an ignition device or an injection device, and the first receptacle being disposed substantially parallel to the inlet valve;

a second receptacle for each of the plurality of cylinders, the second receptacle being configured to receive an ignition device or an injection device, and the second receptacle being disposed substantially parallel to the exhaust valve;

a third receptacle provided for each of the plurality of cylinders, the third receptacle being configured to receive an ignition device or an injection device;

a first valve actuating element for actuating the inlet valve;

a second valve actuating element for actuating the exhaust valve, the first valve actuating element and the second valve actuating element being constructed substantially identically; and a common camshaft for actuating the inlet valve and the exhaust valve via the first valve actuating element and the second valve actuating element, the common camshaft being disposed offset from a cylinder center plane defined by the plurality of cylinders.

In other words, the object of the invention is achieved by a cylinder head which has, per cylinder, an inlet valve, an exhaust valve, a first receptacle and a second receptacle for respective ignition devices, for an ignition device and an injection device or for respective injection devices, and a third receptacle for an injection device or an ignition device, the inlet valve and the exhaust valve being actuated via valve-actuating elements of identical configuration by a common camshaft disposed offset from the center plane of the cylinder, and the first receptacle being disposed essentially parallel to the inlet valve and the second receptacle being disposed essentially parallel to the exhaust valve. Thus, according to the invention, a cylinder head for an internal combustion engine is provided, that allows twin ignition or twin injection due to its three receptacles for two ignition devices and one injection device or for two injection devices and one ignition device. This ensures an optimized ignition and respectively an optimized movement of the charge and thus an improved mixture preparation. Moreover, the cylinder head according to the invention is a weight-saving and compact configuration since it has just two engine valves per cylinder and a common camshaft for the engine valves. Due to the fact that the valve-actuating elements are constructed as identical parts, this cylinder head is furthermore very easy to assemble because there is no risk of a mix-up. And, due to the offsetting of the camshaft, it is, according to the invention, equally easy to work on the inlet side and on the exhaust side of the cylinder head despite the difference in the size of the engine valves.

According to another feature of the invention, the third receptacle is provided for the injection device and advantageously opens into the cylinder in a position laterally adjacent to the inlet valve and to the first receptacle which is provided for the ignition device. The injection device is thus inclined with respect to the inlet valve and the first receptacle for the ignition device and preferably has a spray cone having an angle of about 70 degrees and being inclined at an angle of about 58 degrees with respect to the horizontal and about 15 degrees with respect to the vertical. Other angles are, of course, also possible.

According to a first alternative feature of the invention, the valve-actuating elements are constructed as cam follower levers, which are mounted on a cam follower shaft which is provided below and parallel to the camshaft. As a result, only a small amount of installation space within the cylinder head is required for the cam follower levers, and the cylinder head can be built as an extremely flat construction.

According to a second alternative feature of the invention, the valve-actuating elements are embodied as rocker levers or rockers, which are mounted on two rocker shafts disposed above and parallel to the camshaft. As a result, the rocker space within the cylinder head is easily accessible and therefore configured in such a way as to make assembly very easy.

With the objects of the invention in view there is also provided, in combination with a direct-injection spark-ignition internal combustion engine including cylinders with respective cylinder axes disposed in a cylinder center plane, a cylinder head including an inlet valve per cylinder; an exhaust valve per cylinder; a first receptacle per cylinder, the first receptacle being disposed substantially parallel to the inlet valve; a second receptacle per cylinder, the second receptacle extending substantially parallel to the exhaust valve; a third receptacle per cylinder, the first, second and third receptacles being configured to receive an ignition device or an injection device; a first valve actuating element for actuating the inlet valve; a second valve actuating element for actuating the exhaust valve, the first valve actuating element and the second valve actuating element being constructed substantially identically; and a common camshaft for actuating the inlet valve and the exhaust valve via the first valve actuating element and the second valve actuating element, the common camshaft having a longitudinal axis extending parallel to the cylinder center plane and being spaced from the cylinder center plane by a given spacing distance.

Other features which are considered as characteristic for the invention are set forth in the appended claims.

Although the invention is illustrated and described herein as embodied in a cylinder head for a multi-cylinder direct-injection spark-ignition internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1c is a diagrammatic perspective view of a section of the cylinder head shown in FIG. 1a;

FIG. 2b is a diagrammatic top plan view of a section of the cylinder head shown in FIG. 2a viewed in the direction of the cylinder axis; and FIG. 2c is a diagrammatic perspective view of a section of the cylinder head shown in FIG. 2a.

DESCRIPTION OF THE PREFERRED EMBODIMENTS

Figure 1A:
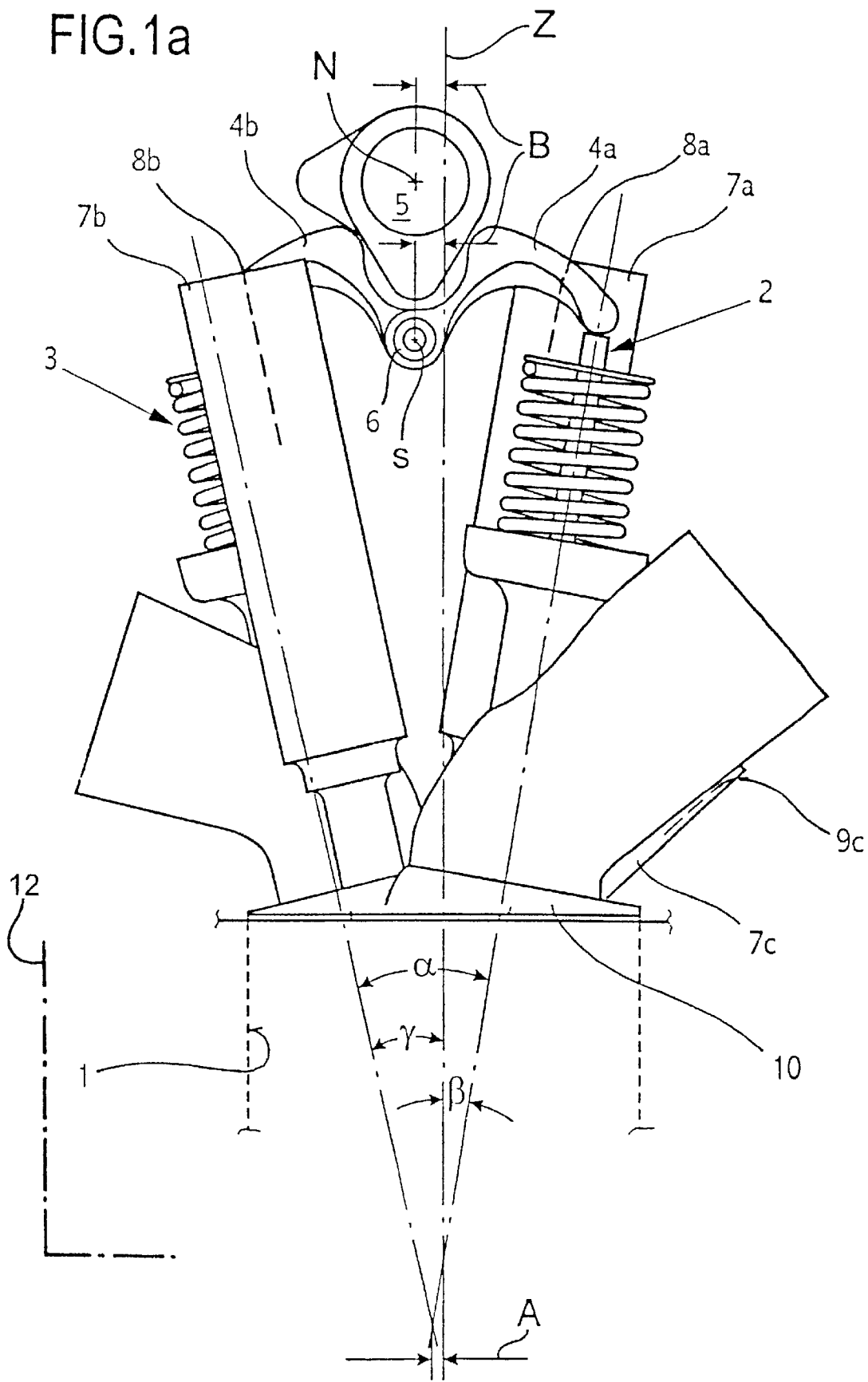
FIG. 1a is a basic diagrammatic side view of a first embodiment of the cylinder head according to the invention viewed in the direction of the camshaft axis.
Figure 1B:
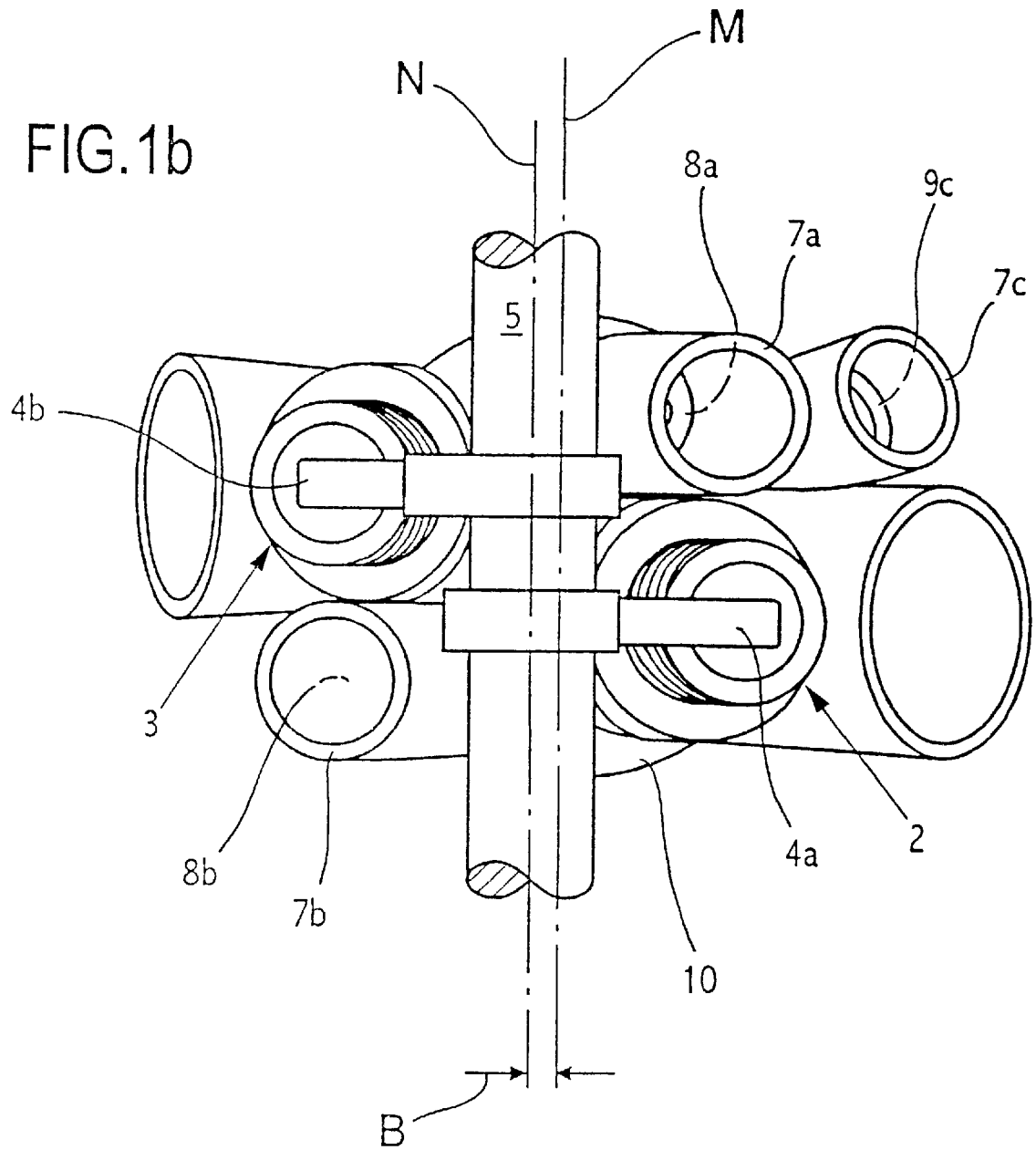
FIG. 1b is a diagrammatic top plan view of a section of the cylinder head shown in FIG. 1a viewed in the direction of the cylinder axis.
Figure 1C:
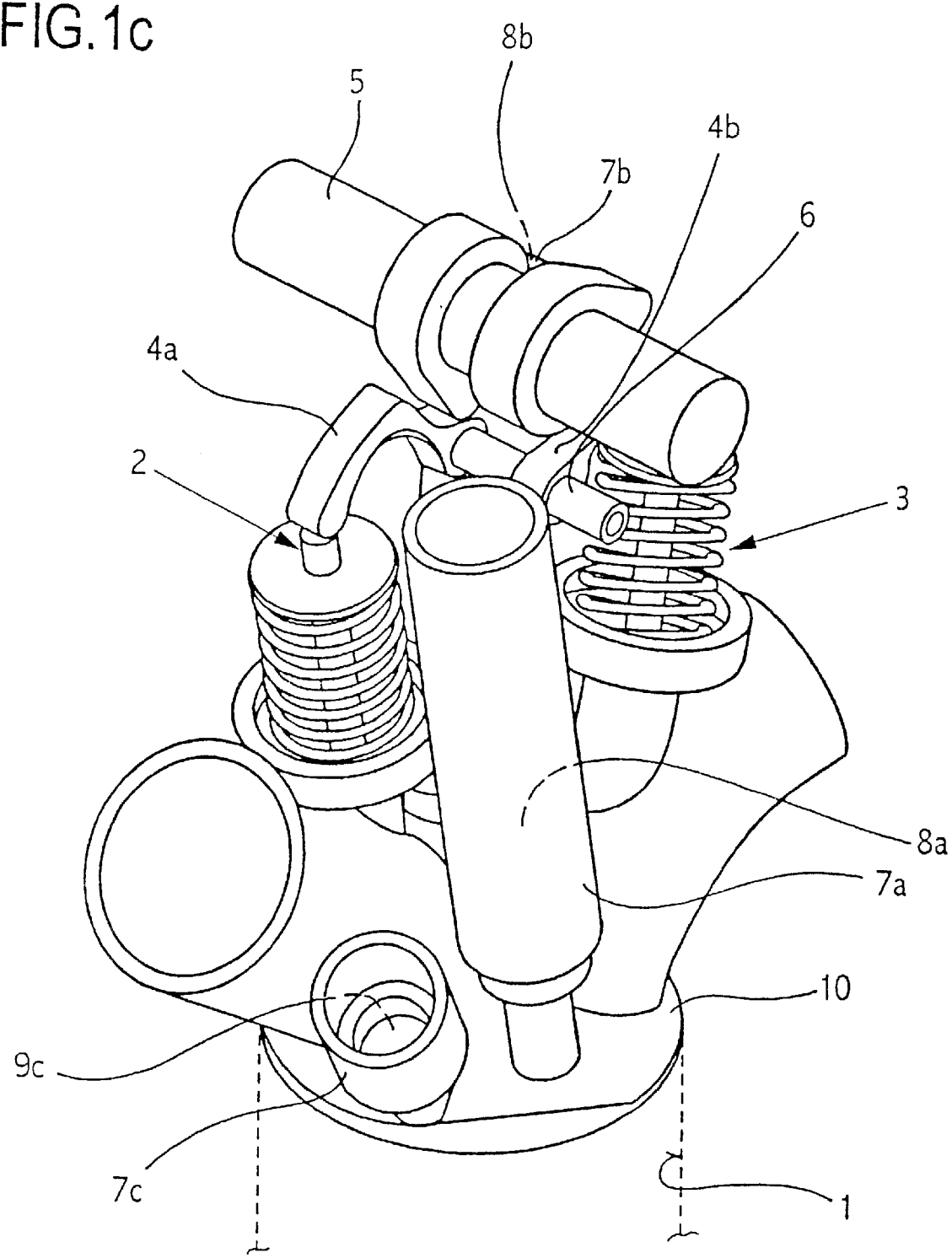

Referring now to the figures of the drawings in detail and first, particularly, to FIGS. 1a to 1c thereof, there is shown a cylinder head 1 according to the invention. The cylinder head 1 is provided for a combustion engine 12 which is only schematically indicated by a dash-dotted line. The cylinder head has an inlet valve 2 and an exhaust valve 3 for each section as shown in the figures, in other words the cylinder head has an inlet valve 2 and an exhaust valve 3 per cylinder 1. The inlet valve 2 and the exhaust valve 3 are inclined at an angle α of about 22 degrees with respect to one another. The inlet valve 2 is inclined at an angle β of about 10 degrees to the cylinder axis Z and the exhaust valve 3 is inclined at an angle γ of about 12 degrees to the cylinder axis Z. The inlet valve 2 has a valve disk diameter of 44 mm, while the exhaust valve 3 has a somewhat smaller valve disk diameter of 35 mm. For the construction of the cylinder head, this results in an offset of the intersection line of the plane in which the inlet valve 2 lies and of the plane in which the exhaust valve 3 lies from the center plane M of the cylinder. The amount of this offset is denoted by A.

The two engine valves 2, 3 are actuated by a common camshaft 5 via valve-actuating elements, which are constructed as cam follower levers or cam followers 4a, 4b. The axis N of the camshaft 5 is likewise disposed offset from the center plane M of the cylinder in the direction of the exhaust side due to the offset of the engine valves 2, 3 and the cam followers 4a, 4b, which have an identical design. The cam follower levers 4a, 4b are all provided on a common cam follower shaft 6, which extends in parallel to and below the camshaft 5. The axis S of the cam follower shaft 6 is offset from the center plane M of the cylinder by the same amount B as the axis N of the camshaft 5.

The amount of the offset A is approximately the same as the amount of the offset B.

A first cylindrical receptacle 7a and a second cylindrical receptacle 7b for two ignition devices 8a and 8b respectively are provided parallel to the inlet valve 2 and the exhaust valve 3 respectively. These receptacles 7a, 7b are arranged offset from the center plane M of the cylinder, just like the engine valves 2, 3. However, the first receptacle 7a and the second receptacle 7b could also be arranged at an angle of up to +/−10 degrees relative to the inlet valve and the exhaust valve. Finally, a third receptacle 7c for an injection device 9c is also provided. The third receptacle 7c opens into the cylinder 1 in an edge region of the dome 10 of the combustion chamber, adjacent to the inlet valve 2 and the first ignition device 8a.

According to other alternative embodiments, however, the first receptacle 7a and the second receptacle 7b can also be provided for an ignition device 8a, 8b and an injection device 9a, 9b or for two injection devices 9a, 9b, while the third receptacle 7c can also be provided for an ignition device 8c.

Figure 2A:
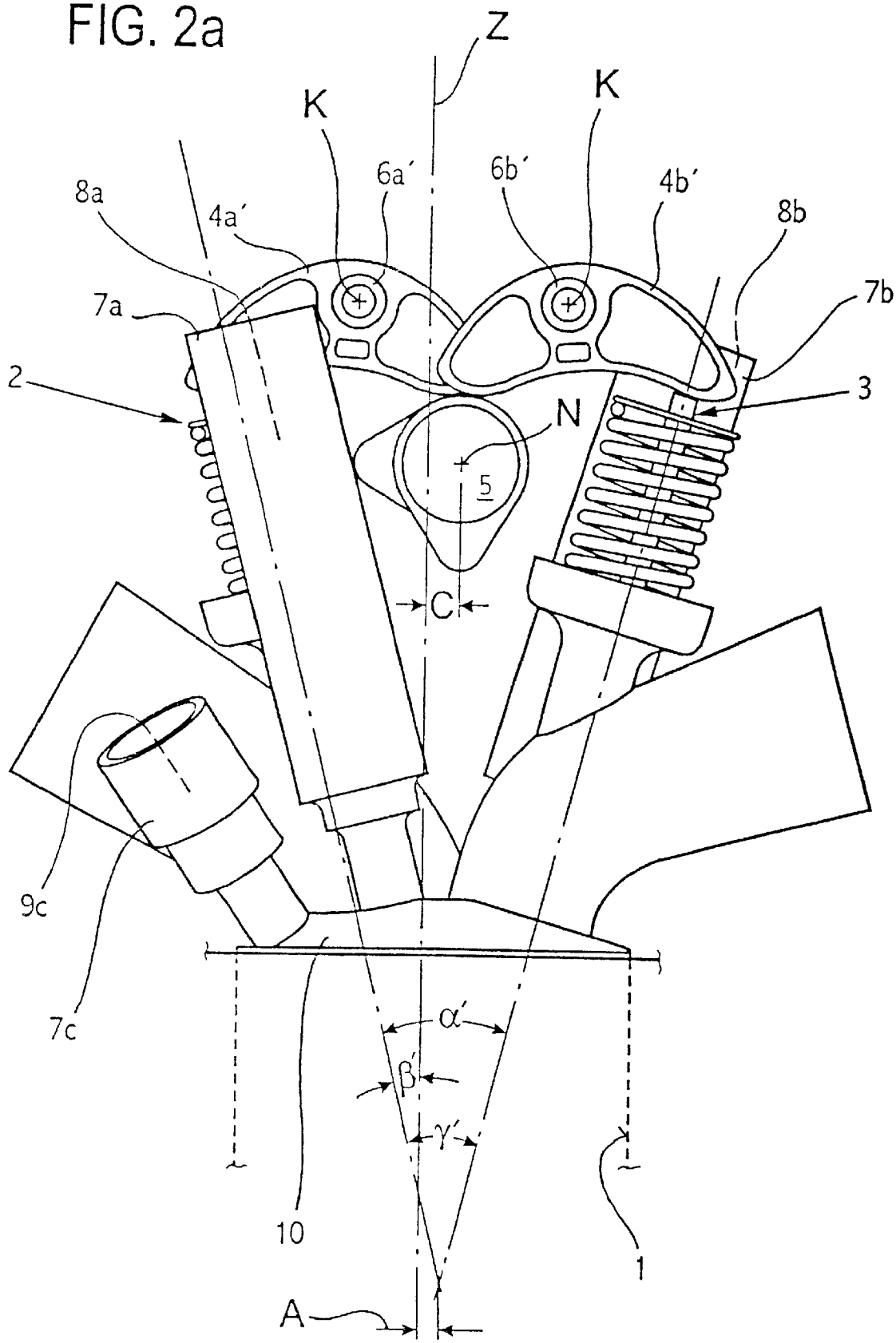
FIG. 2a is a basic diagrammatic side view of a second embodiment of the cylinder head according to the invention viewed in the direction of the camshaft axis.
Figure 2C:
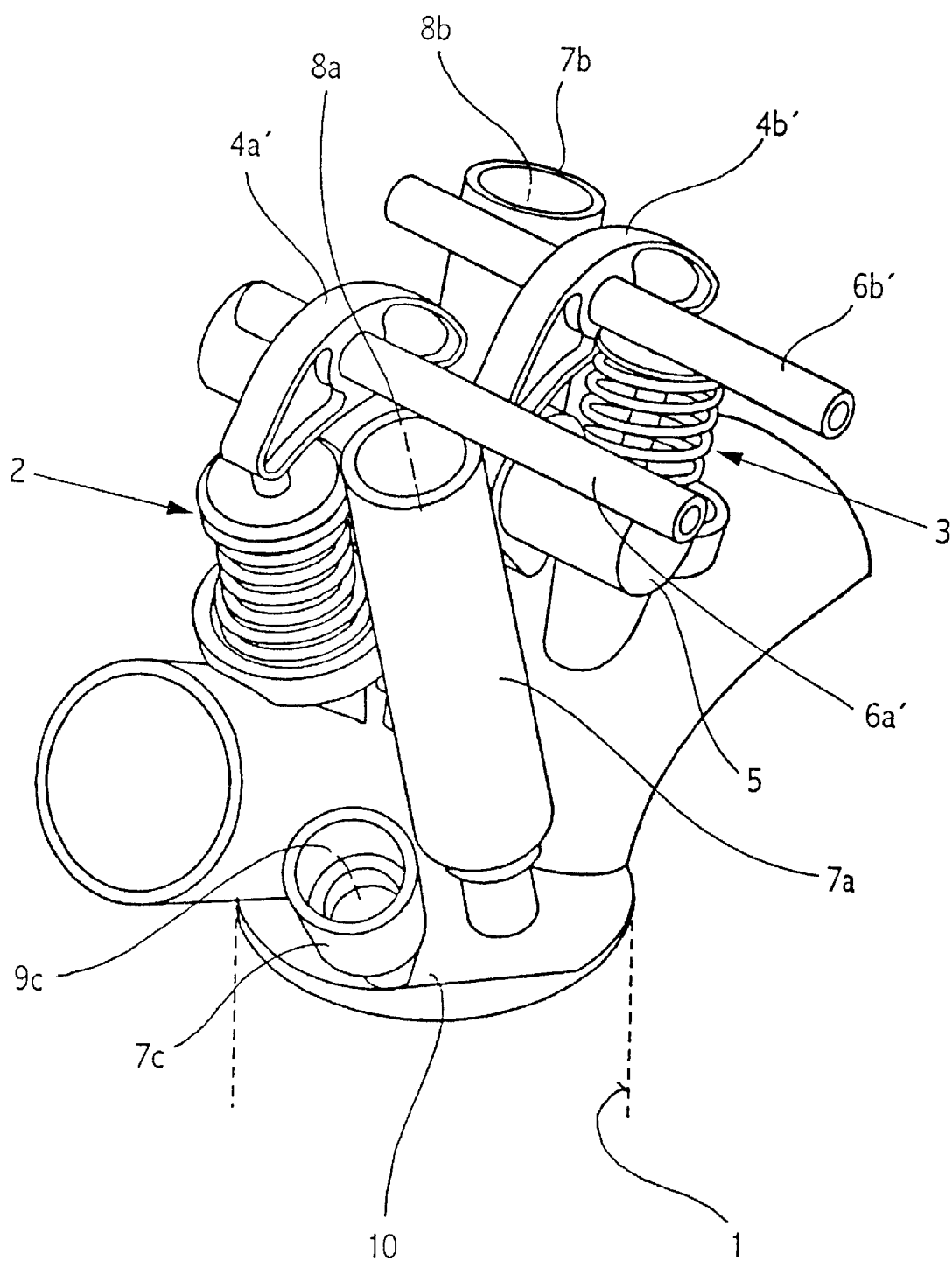

Like the first embodiment shown in FIGS. 1a to 1c, the second alternative embodiment of the cylinder head according to the invention, which is shown in FIGS. 2a to 2c, has a first receptacle 7a and a second receptacle 7b for respective ignition devices 8a, 8b and a third receptacle 7c for an injection device 9c.

In the case of the cylinder head shown in FIGS. 2a to 2c, the engine valves 2, 3 are actuated by rocker levers or rockers 4a', 4b' instead of cam follower levers 4a, 4b. The rocker levers 4a', 4b' for the engine valves 2, 3 have an identical construction. Here, the rocker levers 4a' for the inlet valves 2 are mounted on a first rocker shaft 6a', while the rocker levers 4b' for the exhaust valves 3 are here mounted on a second rocker shaft 6b'. Both rocker shafts 6a', 6b' extend parallel to one another above the camshaft 5. The center between the two axes K of the rocker shafts 6a', 6b' is offset by the amount C from the center plane M of the cylinder, just like the axis N of the camshaft 5.

In contrast to the first alternative embodiment shown in FIGS. 1a to 1c, the inlet valve 2 and the exhaust valve 3 of the embodiment shown in FIGS. 2a to 2c are inclined with respect to one another at an angle α' of about 30 degrees. The inlet valve 2 is inclined at an angle β' of about 15 degrees with respect to the cylinder axis Z and the exhaust valve 3 at an angle γ' of about 16 degrees with respect to the cylinder axis Z. The inlet valve 2 and the exhaust valve 3 of the embodiment shown in FIGS. 2a to 2c also have a slightly larger valve disk diameter than those of the embodiment shown in FIGS. 1a to 1c.

We claim:

1. A cylinder head for a direct-injection spark-ignition internal combustion engine with a plurality of cylinders, comprising:

an inlet valve provided for each of a plurality of cylinders;

an exhaust valve provided for each of the plurality of cylinders;

a first receptacle provided for each of the plurality of cylinders, said first receptacle being configured to receive an element selected from the group consisting of an ignition device and an injection device, said first receptacle being disposed substantially parallel to said inlet valve;

a second receptacle for each of the plurality of cylinders, said second receptacle being configured to receive an element selected from the group consisting of an ignition device and an injection device, said second receptacle being disposed substantially parallel to said exhaust valve;

a third receptacle provided for each of the plurality of cylinders, said third receptacle being configured to receive an element selected from the group consisting of an ignition device and an injection device;

a first valve actuating element for actuating said inlet valve;

a second valve actuating element for actuating said exhaust valve, said first valve actuating element and said second valve actuating element being constructed substantially identically; and a common camshaft for actuating said inlet valve and said exhaust valve via said first valve actuating element and said second valve actuating element, said common camshaft being disposed offset from a cylinder center plane defined by the plurality of cylinders.

2. The cylinder head according to claim 1, wherein:

said first receptacle is configured to receive an ignition device; and said third receptacle is configured to receive an injection device, said third receptacle opens into a respective one of the cylinders in a position laterally adjacent to said inlet valve and to said first receptacle.

3. The cylinder head according to claim 1, including:

a cam follower shaft disposed below and parallel to said common camshaft; and said first and second valve-actuating elements being cam follower levers mounted on said cam follower shaft.

4. The cylinder head according to claim 2, including:

a cam follower shaft disposed below and parallel to said common camshaft; and said first and second valve-actuating elements being cam follower levers mounted on said cam follower shaft.

5. The cylinder head according to claim 1, including:

two rocker shafts disposed above and parallel to said common camshaft; and said first valve-actuating element being a first rocker lever mounted on a first one of said two rocker shafts; and said second valve-actuating element being a second rocker lever mounted on a second one of said two rocker shafts.

6. The cylinder head according to claim 2, including:

two rocker shafts disposed above and parallel to said common camshaft; and said first valve-actuating element being a first rocker lever mounted on a first one of said two rocker shafts; and said second valve-actuating element being a second rocker lever mounted on a second one of said two rocker shafts.

7. In combination with a direct-injection spark-ignition internal combustion engine including cylinders with respective cylinder axes disposed in a cylinder center plane, a cylinder head comprising:

an inlet valve provided for each of the cylinders;

an exhaust valve provided for each of the cylinders;

a first receptacle provided for each of the cylinders, said first receptacle being configured to receive an element selected from the group consisting of an ignition device and an injection device, said first receptacle being disposed substantially parallel to said inlet valve;

a second receptacle for each of the cylinders, said second receptacle being configured to receive an element selected from the group consisting of an ignition device and an injection device, said second receptacle extending substantially parallel to said exhaust valve;

a third receptacle provided for each of the cylinders, said third receptacle being configured to receive an element selected from the group consisting of an ignition device and an injection device;

a first valve actuating element for actuating said inlet valve;

a second valve actuating element for actuating said exhaust valve, said first valve actuating element and said second valve actuating element being constructed substantially identically; and a common camshaft for actuating said inlet valve and said exhaust valve via said first valve actuating element and said second valve actuating element, said common camshaft having a longitudinal axis extending parallel to the cylinder center plane and being spaced from the cylinder center plane by a given spacing distance.

8. The cylinder head according to claim 7, wherein:

said first receptacle is configured to receive an ignition device; and said third receptacle is configured to receive an injection device, said third receptacle opens into a respective one of the cylinders in a position laterally adjacent to said inlet valve and to said first receptacle.

9. The cylinder head according to claim 7, including:

a cam follower shaft extending parallel to said common camshaft and disposed between said common camshaft and the cylinders; and said first and second valve-actuating elements being cam follower levers mounted on said cam follower shaft.

10. The cylinder head according to claim 7, including:

two rocker shafts extending parallel to said common camshaft and disposed further away from the cylinders than said common camshaft; and said first valve-actuating element being a first rocker lever mounted on a first one of said two rocker shafts; and said second valve-actuating element being a second rocker lever mounted on a second one of said two rocker shafts.

* * * * *